(12) United States Patent
Allaire et al.

(10) Patent No.: US 7,882,620 B2
(45) Date of Patent: Feb. 8, 2011

(54) COMPOSITE CERAMIC DEVICE FOR MEASURING THE TEMPERATURE OF LIQUIDS

(75) Inventors: Claude Allaire, St-Eustache (CA); Jean-Benoit Pineault, Chicoutimi (CA)

(73) Assignee: Groupe Refraco Inc., Chicoutimi, QC (CA)

( * ) Notice: Subject to any disclaimer, the term of this patent is extended or adjusted under 35 U.S.C. 154(b) by 463 days.

(21) Appl. No.: 10/557,355

(22) PCT Filed: May 12, 2004

(86) PCT No.: PCT/CA2004/000713

§ 371 (c)(1),
(2), (4) Date: Feb. 21, 2007

(87) PCT Pub. No.: WO2004/104534

PCT Pub. Date: Dec. 2, 2004

(65) Prior Publication Data

US 2007/0160427 A1 Jul. 12, 2007

Related U.S. Application Data

(60) Provisional application No. 60/472,140, filed on May 21, 2003.

(51) Int. Cl.
*H01C 17/02* (2006.01)

(52) U.S. Cl. .......................... 29/613; 29/612; 136/230; 136/232; 374/139; 374/179

(58) Field of Classification Search .................. 29/613, 29/612, 874; 136/230, 232, 234, 242; 374/139, 374/140, 179, E1.017
See application file for complete search history.

(56) References Cited

U.S. PATENT DOCUMENTS

| 3,398,027 A | * | 8/1968 | Leger et al. ................. 136/234 |
| 3,668,099 A | | 6/1972 | Rittiger et al. |
| 3,758,397 A | | 9/1973 | Russell et al. |
| 4,871,263 A | | 10/1989 | Wilson |
| 6,632,018 B2 | * | 10/2003 | Isshiki et al. ................. 374/179 |

FOREIGN PATENT DOCUMENTS

| EP | 0 887 632 | 12/1998 |
| GB | 2 196 430 | 4/1988 |

* cited by examiner

*Primary Examiner*—Thiem Phan

(57) ABSTRACT

A thermocouple shield assembly comprising a first tube having an upper portion and a lower portion with a lower end, the first tube including a first elongated cavity closed at the lower end and receiving the thermocouple, a second tube having a second elongated cavity with at least one open end and receiving the upper portion while a part of the lower portion containing the thermocouple extends out of the open end, and a gap between adjacent walls of the second elongated cavity and of the first tube such as to allow independent thermal deformations of the first and second tubes. In use, at least a portion of the part of the lower portion of the first tube is subjected to a given temperature while the second tube is subjected to a different temperature. Methods of manufacturing and of assembling such a thermocouple shield assembly are also presented.

11 Claims, 4 Drawing Sheets

COMPOSITE CERAMIC DEVICE FOR MEASURING THE TEMPERATURE OF LIQUIDS

CROSS-REFERENCE TO RELATED APPLICATION

This application claims priority from PCT Application No. PCT/CA2004/000713, filed on May 12, 2004, which itself claims priority on U.S. patent application Ser. No. 60/472,140, filed on May 21, 2003.

BACKGROUND OF THE INVENTION

1. Field of the Invention

The present invention relates to protective shielding for instruments for the measurement of the temperature of liquids, more particularly to a refractory thermocouple shield assembly.

2. Description of the Prior Art

In various industries, such as the metal-lurgical industry, measurement of the temperature of a liquid at high temperature is required. An example is molten aluminium contained in reverberatory melting and holding furnaces. Such furnaces (hereinafter referred to as aluminium treatment furnaces) contain molten aluminium at a temperature of about 700-800° C. Such a metal-production process. is controlled by measurement of temperature. Measurements are effected by inserting into the molten metal a thermocouple either from the side of the furnace or from the top. The thermocouples used in these applications are made of metallic thermoelectric elements having a hot junction at one end. In the present state of the art, these elements are protected by use of concentric tubular inner and outer shields. The lifetime of such assemblies is essentially determined by the integrity of the outer shield during operation.

Traditionally, cast-iron outer protective shields have been used in the thermocouple assemblies of aluminium treatment furnaces. The lifetime of such assemblies is currently approximately between 3 and 8 days when used on a continuous basis. However cast iron presents several disadvantages, two of which are that cast iron is soluble in molten aluminium, and very ductile at the operating temperature of aluminium treatment furnaces. The ductility promotes plastic deformation of the shield during operation and can consequently result in breakage of the thermocouple elements.

During the last decade, ceramic protective shields made from technical ceramics have also been used. One of the better performing materials for this application is SiAlON, which is a manufactured technical ceramic comprising a solid solution of $Si_3N_4$ and $Al_2O_3$. While the lifetime of thermocouple assemblies comprising protective shields fabricated from technical ceramics can reach about one year, the brittleness of those ceramics renders it very difficult in an industrial environment to handle such assemblies without breakage for such a period of time. Moreover, technical ceramics are very expensive. This is due to the costs of the process used to produce the powder required for their manufacture, such as the vapor phase process together with the forming techniques involved, e.g., reaction bonding, use of a high-temperature isostatic press, etc.

More recently, ceramic protective shields made from castable refractories have also been tested. The maximum lifetime obtained from such protective shields is usually less than two weeks. Moreover, a drawback of castable refractories is that they are heterogeneous materials which generally have coarse grains with a diameter that may exceed 5 mm. This usually prevents the production of refractory pieces such as tubes having a low thickness, since the minimum thickness should usually be at least equal to four times the maximum grain size.

Also, the relatively high porosity of castable refractories as compared with technical ceramics confers on them relative low strength and thermal conductivity. Low thermal conductivity is detrimental to thermal shock resistance, especially when a refractory component is not sufficiently thin. Under such conditions, high thermal gradients are developed in the component during service, which promotes high induced stresses in the material. Low strength is also detrimental to thermal shock resistance when the firing temperature is not high enough to promote ceramic bonding. In such a case, thermal shock damage proceeds by long crack initiation, which is promoted by low strength. Conversely, castables fired at a high temperature develop ceramic bonds and, in such a case, thermal shock damage proceeds by short crack propagation which is promoted by-high strength. Thermal shock effects are particularly pronounced when the length of the refractory components exceeds one meter. The critical firing temperature for the interaction of the foregoing two opposing behaviors is, for aluminosilicate castables, about 1200° C. At higher temperatures, mullitisation of the castable's matrix takes place and ensures ceramic bonding within the material.

A current practice to attempt to compensate for the above-mentioned weaknesses of the castable refractories is to embody steel structures or reinforcement into their fabrication. One example is the casting of a protective layer of refractory concrete on the interior or exterior of a steel pipe or tube. The steel reinforcement increases bending resistance and prevents, catastrophic failure in the event of cracking of the refractory concrete. However, such a steel reinforcement introduces new problems. Firstly, the refractory concrete must be adequately anchored to the steel reinforcement. Secondly, the difference in thermal expansions between steel and refractory concrete usually leads to increased cracking of the concrete. Whilst steel reinforcement is feasible in some applications, it is generally impracticable for long thin-walled thermocouple shields, where the difference in thermal expansions leads to unacceptable cracking of the refractory.

Although thermal shock resistance is of great concern for thermocouple ceramic shields (technical ceramics and refractories), the major problem encountered with refractory castable tubes in aluminium treatment furnaces is their low resistance to thermal stresses induced near the metal line where the temperature gradient in the furnace is at a maximum. Even after thermal equilibrium is reached, the strength of such tubes is not high enough to enable long term resistance to stresses induced at that location. Increasing the firing temperature of the tube can be beneficial, but this increases production costs. Moreover, refractories used under cyclic conditions suffer damage by thermal fatigue. This means that, even with higher strength, such materials will have a limited service life because they have to be removed from the molten metal and then re-immersed after each campaign.

One other important limitation of standard refractory shields is that they usually retard the time response of the thermocouple assembly, especially when their thickness is high and their thermal productivity low.

Accordingly, there is a need for a thermocouple shield assembly which has increased durability in a thermal gradient environment while offering reduced time response at a relatively low cost.

SUMMARY OF INVENTION

It is therefore an aim of the present invention to provide a thermocouple shield assembly which has increased durability in a thermal gradient environment.

It is also an aim of the present invention to provide a thermocouple shield assembly which offers reduced time response.

It is another aim of the present invention to provide a thermocouple shield assembly that can be manufactured at reduced costs.

It is a further aim of the present invention to provide a method for manufacturing a novel thermocouple shield assembly.

Therefore, in accordance with the present invention, there is provided a shield assembly for protecting a thermocouple, the assembly comprising a first tube having an upper portion and a lower portion, the lower portion including a lower end, the first tube including a first elongated cavity closed at the lower end and receiving the thermocouple, a second tube having a second elongated cavity with at least one open end, the second elongated cavity receiving the upper portion of the first tube while a part of the lower portion of the first tube containing the thermocouple extends out of the open end, and a gap between adjacent walls of the second elongated cavity and of the first tube, the gap being such as to allow independent thermal deformations of the first and second tubes, whereby the lower end at least a portion of the part of the lower portion of the first tube are adapted to be in a first medium having a first temperature while the second tube is adapted to be in a second medium having a second temperature, the first and second temperatures being different.

Also in accordance with the present invention, there is provided a method of assembling a thermocouple assembly, the method comprising the steps of providing a first tube having a first elongated cavity and a closed end, providing a second tube having a second elongated cavity and an open end in communication with the second elongated cavity, the second elongated cavity being sized such as to be able to loosely receive a first portion of the first tube, inserting a thermocouple into the first elongated cavity such that the thermocouple is received at least in a second portion of the first tube, and inserting the first tube into the second elongated cavity such the first portion is retained therewithin and the second portion extends out of the second elongated cavity through the open end.

Further in accordance with the present invention, there is provided a method of manufacturing a shield assembly for protecting a thermocouple, the method comprising the steps of assembling a first mould having a first mould cavity forming a first tubular shield having an upper section, a smaller lower section and a first elongated cavity for receiving the thermocouple, assembling a second mould having a second mould cavity forming a second tubular shield having a second elongated cavity with a first section larger than the upper section and a second section larger than the lower section and smaller than the upper section, the second elongated cavity having an open end in the second section, filling the first and second mould cavities with a liquid mix of refractory, castable ceramic material, letting the liquid mix dry for an appropriate amount of time, disassembling the first and second moulds to free the first and second tubular shields, firing the first and second tubular shields to cure the refractory castable ceramic material, and inserting the upper section into the first section such that the lower section extends out of the second section through the open end.

BRIEF DESCRIPTION OF THE DRAWINGS

Reference will now be made to the accompanying drawings, showing by way of illustration a preferred embodiment thereof and in which.

DESCRIPTION OF THE PREFERRED EMBODIMENTS

The present invention is directed to a refractory shield assembly for thermocouples that has increased durability in a thermal gradient environment such as a molten metal treatment furnace whilst offering reduced time response.

Figure 3:
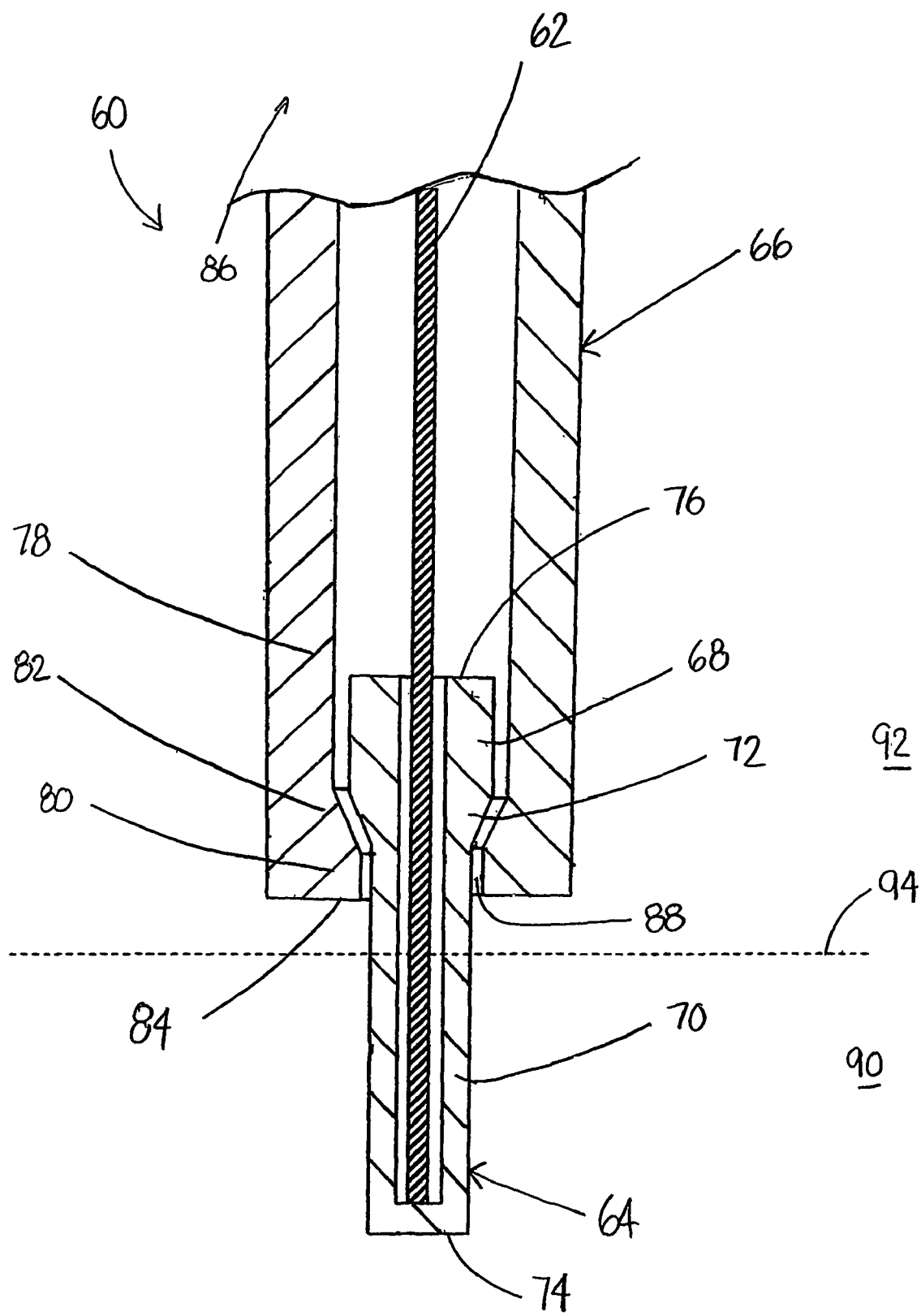
FIG. 3 is a side view, in cross-section, of a thermocouple assembly with a shield fabricated using the moulds of FIGS. 1-2 and inserted in a furnace from a top thereof.
Figure 4:
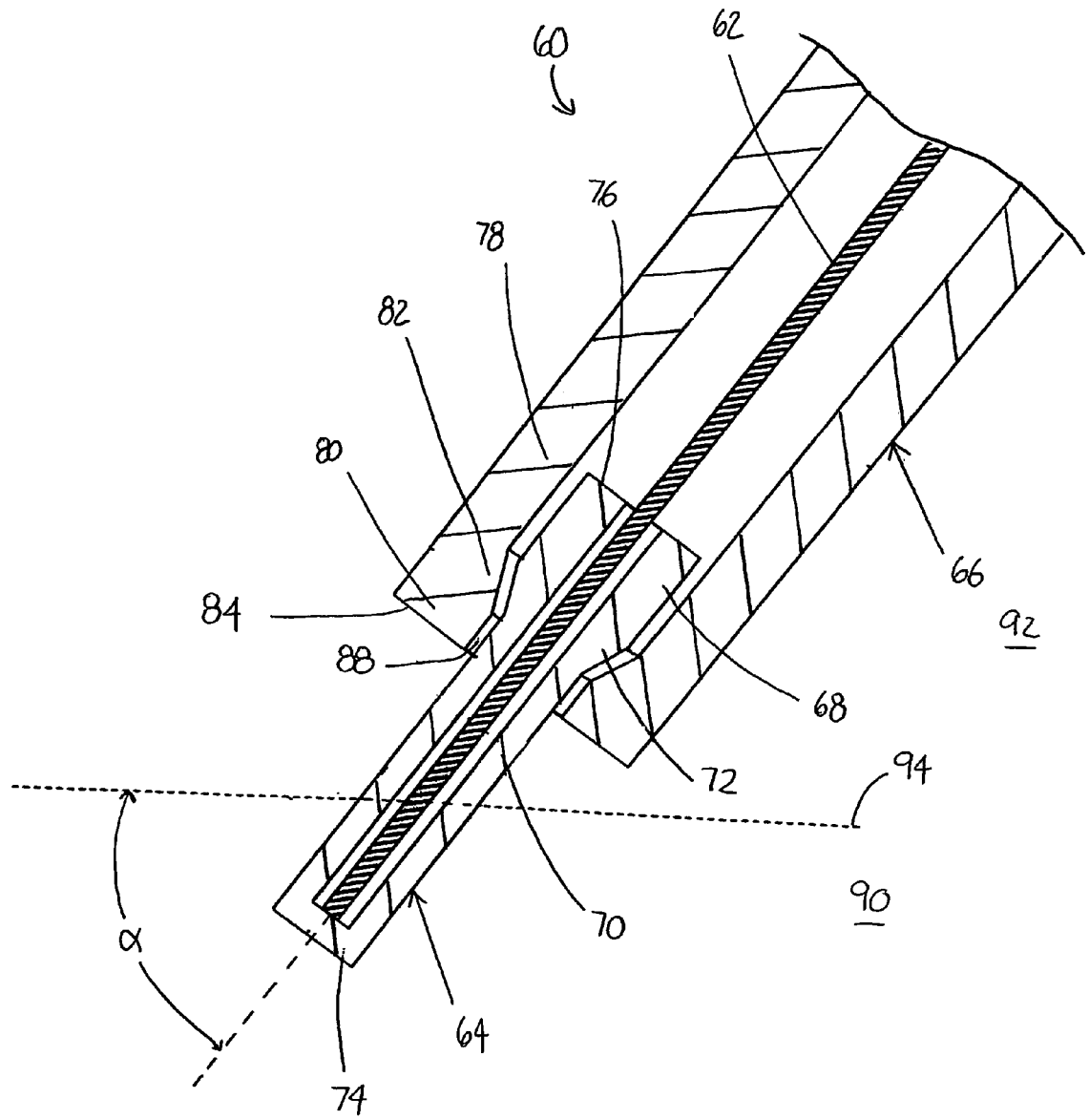
FIG. 4 is a side view, in cross-section, of the thermocouple assembly of FIG. 3 inserted in a furnace from a side thereof.

A schematic representation of a thermocouple shield assembly 60 according to a preferred embodiment of the present invention is shown in FIGS. 3-4. The assembly 60 is usually either inserted vertically from the top of a furnace (FIG. 3) or at an angle α from the side of a furnace (FIG. 4). The assembly 60 comprises a thermocouple 62 protected by first and second tubes 64 and 66. The thermocouple 62 is preferably composed of a thermo-electric element inserted into an inner metallic shield, as is known in the art. The first and second tubes 64 and 66 preferably have a circular cross-section.

The first tube 64 has a cavity with a constant inner diameter sized such as to receive the thermocouple 62. The outer dimensions of the first tube 64 define a large section 68, a small section 70, and a transition section 72 in between. The first tube has one closed end 74 located in the small section 70, and one open end 76 located in the large section 68.

The second tube 66 has a constant outer diameter. The inner dimensions of the second tube 66 define a cavity having a large section 78, a small section 80, and a transition section 82 in between. The second tube 66 has an open end 84 located at the small section 80 and another open end 86 located at the large section 78. The large, small and transition sections 78,80,82 of the cavity of the second tube 66 are adapted to respectively receive the large, small and transition sections 68,70,72 of the first tube 64.

The first tube 64 is thus inserted, closed end 74 first, into the cavity of the second tube 66 through the top open end 86. A gap 88 is defined between walls of the second tube 66 and of the first tube 64 such as to allow for independent thermal expansion of the tubes 64,66. The outer dimensions of the first tube 64 and the inner dimensions of the second tube 66 are such that the large and transition sections 68,72 of the first tube 64 will be retained in the second tube 66 while allowing most of the small section 70 of the first tube 64 to extend out of the open end 84 to be immersed in the molten metal 90. Preferably, at least approximately ⅔ of the length of the first tube 64 is immersed in the molten metal 90. The first tube 64 may have a density lower than that of the molten metal 90, in which case its immersion is maintained by the positioning of the metallic inner protective shield, which opposes to buoyant forces.

During operation, such as in an aluminium treatment furnace, the first tube 64 is mostly exposed to the lower temperature of the molten metal 90, whilst the second tube 66 is mostly exposed to the higher temperature of the furnace atmosphere 92. The part of the first tube 64 exposed to the furnace atmosphere 92 is limited such as to significantly reduce thermal gradients therein. In addition, the gap 88 allows both tubes 64,66 to expand freely and thus significantly reduces induced thermal stresses close to the metal line 94.

The tubes 64,66 can be made from any metallic or non-metallic high-temperature resistant material. An example of suitable metallic material is grey cast iron, although the use of a fine ceramic material that is chemically compatible with its field of use is preferred to the use of a metallic material. Examples of such ceramics are SiAlON, $SI_3N_4$, AlN, $Al_2O_3$, $MgAl_2O_3$, Sic, $ZrO_2$, $B_4C$, BN, mullite, phosphorus pentoxide-based ceramics and other such materials for molten metal treatment furnaces.

In a preferred embodiment, the tubes 64,66 are made of a refractory castable ceramic that is chemically compatible with the field of use and fired to a temperature higher than about 500 to 600° C. Castable refractory materials suitable for the purpose of the invention include Magnesia, Dolomite, Magnesia-chrome, Zircon, Magnesio-aluminate, Alumino-silicate, Silicon carbide-based materials, fused silica and others. Of these, the preferred material is silicon carbide with a SiC content higher than 50 wt per cent and a maximum grain size of 5 mm, which is pre-fired to 1200° C. or less. Table 1 below shows a preferred composition for the material used to manufacture the tubes 64,66.

TABLE 1

CHARACTERISTICS OF THE PREFERRED REFRACTORY CASTABLE CERAMIC FOR THE FABRICATION OF TUBES 64,66

Characteristics

Composition (%)

| | |
|---|---|
| Sic | 75 |
| $Al_2O_3$ | 12 |
| $SiO_2$ | 10 |
| CaO | 2 |
| Maximum grain size (mm) | 5 |

Properties:

| | |
|---|---|
| Cold modulus of rupture @ 1200° C. (MPa) | 32.2 |
| Coefficient of thermal expansion @ 1200° C. ($x10^{-6}$ $C.^{-1}$) | 10.1 |
| Bulk density @ 815° C. ($g/cm^3$) | 2.65 |
| Porosity @ 815° C. (%) | 13.6 |
| Thermal conductivity @ 600° C. (W/m° C.) | 12 |

The present invention also comprises a method of manufacturing long thin-walled refractory tubes for use as protective thermocouple shields. As discussed above, the manufacture of such tubes from technical ceramics is already known, but castable refractories have generally been deemed unsuitable for that purpose. Moreover, the axial length of tubes made from castable refractories is usually limited to a maximum of less than one meter. However, if a thermocouple assembly is to be introduced through the roof of a state-of-the-art high-capacity aluminium treatment furnace, a significantly greater length of protective shielding is required, e.g., up to 2 or 3 meters. With the method of the present invention, a refractory thermocouple shield with a tube wall thickness of less than 1 cm and a tube length of more than 225 cm can advantageously be obtained.

Figure 1:
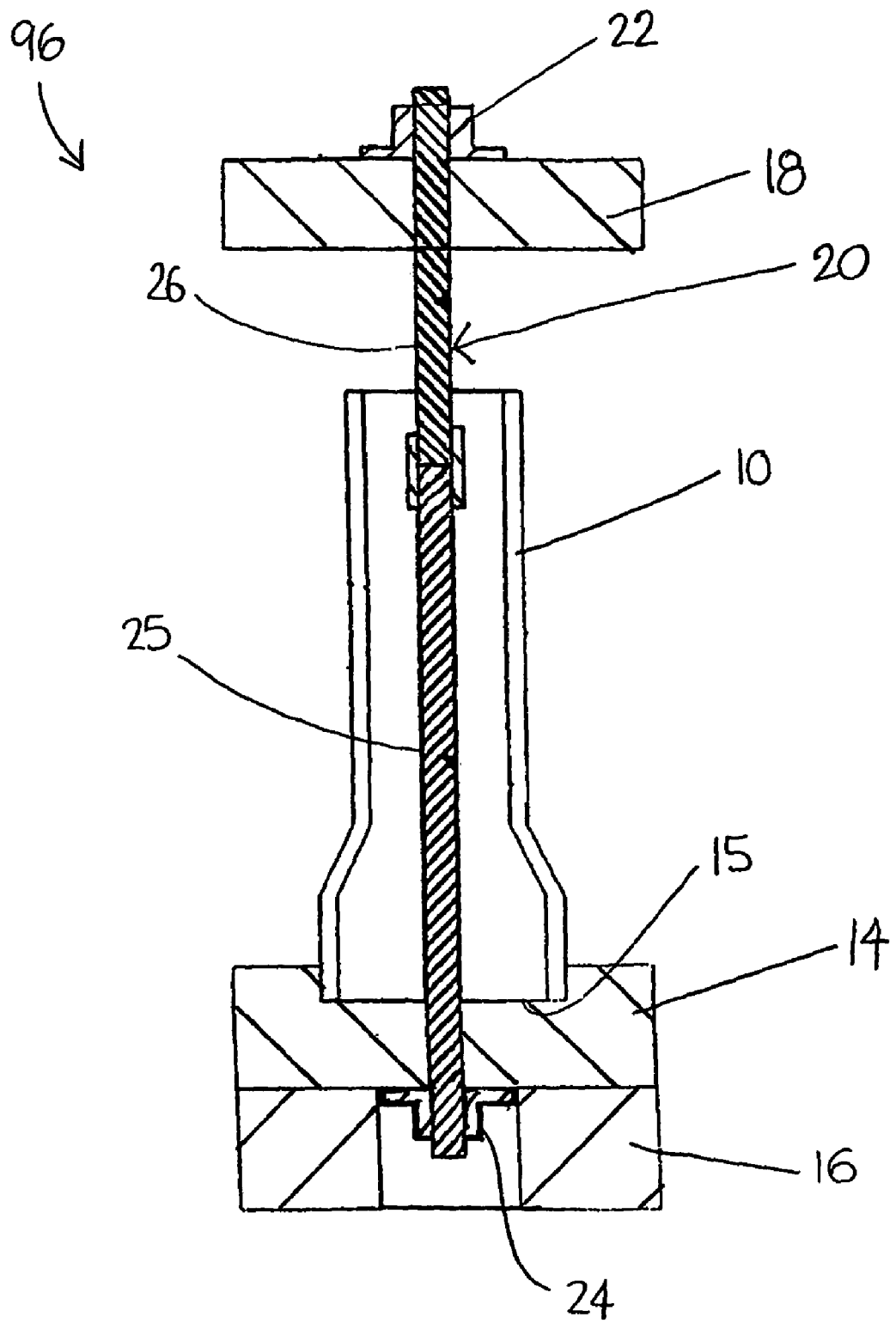
FIG. 1 is a side view, in cross-section, of a mould for fabricating a first tube of a thermocouple shield assembly according to a preferred embodiment of the present invention.

Referring concurrently to FIGS. 1 and 3, a first mould 96 for molding the first tube 64 is shown. The first mould 96 comprises a plastic tube 10 divided longitudinally into two parts (one of which has been removed in FIG. 1 for illustrative purposes) which are held together by a plastic tape and by steel collars screwed on to a vertical wood panel (not shown). The plastic tube 10 is profiled such as to form the large, small and transition sections 68,70,72 of the first tube 64. A first wooden board 14, perpendicular to the vertical wood panel (not shown), has a hole 15 in the middle thereof which holds in place the plastic tube 10 where the large section 68 is formed. A second wooden board 16 is fixed under the first wooden board 14. A third wooden board 18 is fixed perpendicularly to the vertical wood panel (not shown), spaced apart from and above the plastic tube 10, such as to retain a threaded steel rod 20. The steel rod is firmly positioned between the third wooden board 18 and the second wooden board 16 using bolts 22 and 24 on the outer side of each board.

The steel rod 20 is the basic support for the inside part of the mould and will determine the inner diameter of the tube 64 such as to form the cavity receiving the thermocouple 62. Fixing the rod 20 firmly at each end enables a perfectly straight and centered position within the mould. The steel rod 20 is covered with a plastic film (not shown) before positioning within the mould 96, which enables the rod 20 to be safely withdrawn during subsequent stripping. The steel rod 20 is made of lower and upper parts 25,26 assembled where the closed end 74 of the tube 64 will be defined. The upper part 26 will be pulled out when casting the closed end 76 of the first tube 64. A separate plastic cap (not shown) is used during casting to cover the end of the lower part 25 after the upper part 26 has been removed.

Figure 2:
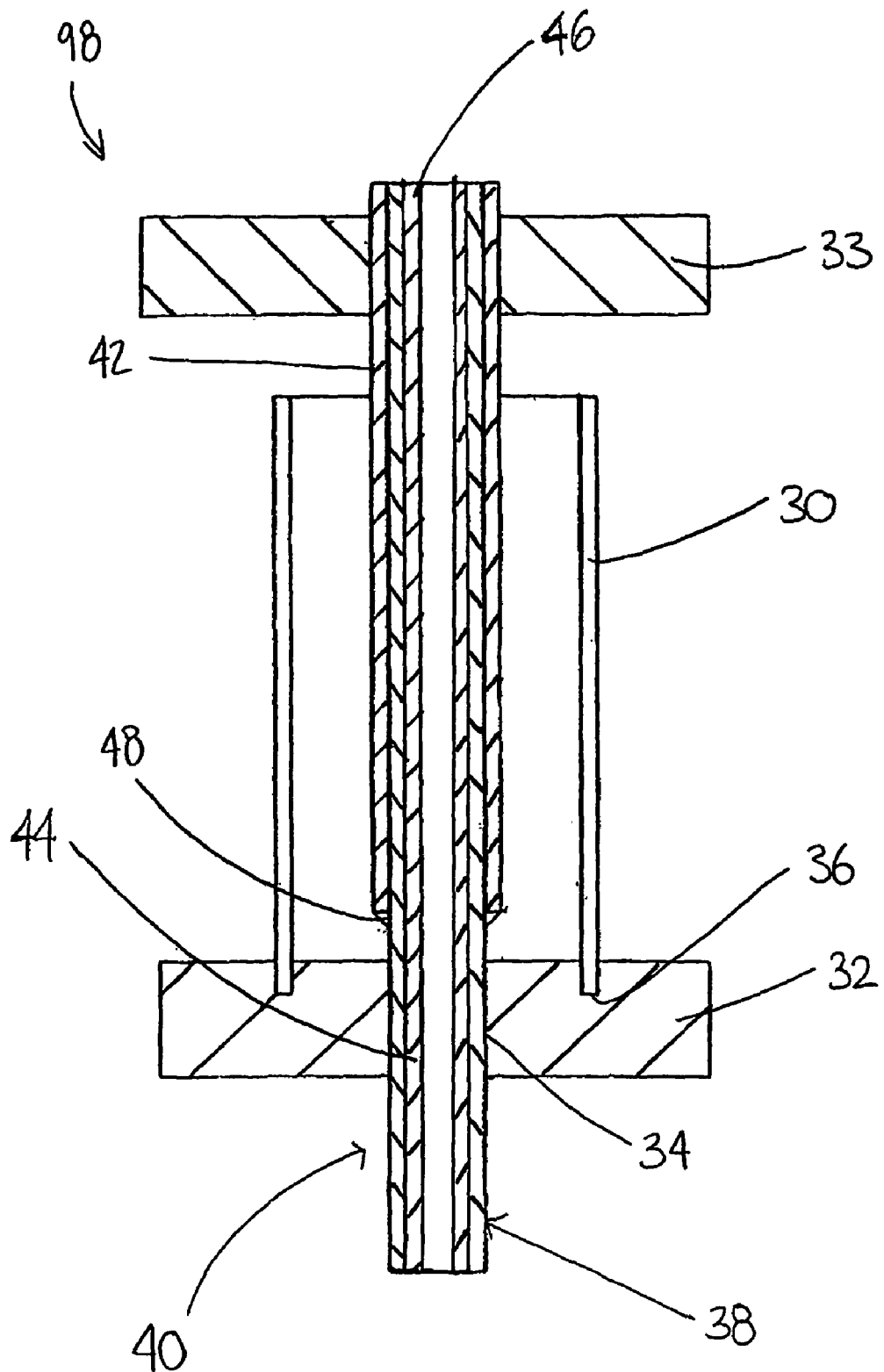
FIG. 2 is a side view, in cross-section; of a mould for fabricating a second tube of a thermocouple shield assembly according to a preferred embodiment of the present invention.

Referring to concurrently FIGS. 2 and 3, a second mould 98 for molding the second tube 66 is shown. The second mould 98 comprises an outer plastic tube 30 having a constant diameter. The outer plastic tube 30 is also cut longitudinally into two parts (one of which has been removed in FIG. 2 for illustrative purposes) which are held together by a plastic tape and by steel collars screwed on to a vertical wood panel (not shown). A fourth wooden board 32 is fixed perpendicularly to the bottom of the vertical panel (not shown) while a fifth wooden board 33 is similarly fixed to the top. The fourth wooden board 32 has a through hole 34 in its middle and a circular slot 36 around the hole 34. The slot 36 holds in place the outer plastic tube 30 and the hole 34 positions a smaller-diameter end 38 of an inner mould 40 adapted to form the large, small and transition sections 78,80,82 of the cavity of the second tube 66.

The inner mould 40 is made of three layers of tubes comprising first and second inner plastic tubes 42,44 on the outside, and a steel tube 46 on the inside. All three tubes 42, 44 and 46 are inserted tightly one inside the other. All three tubes 42,44,46 are retained at a top end thereof by the fifth wooden board 33. The outermost tube, first inner plastic tube 42, is cut to the length of the large section 78 of the tube 66, such that the bottom end of the tube 42 is located apart from the fourth wooden board 32. A tapered ring 48 of mouldable material keeps the first inner plastic tube 42 at its appropriate vertical position and forms the transition section 82 of the tube 66. The bottom end of the second inner plastic tube 44 forms the smaller-diameter end 38 of the inner mould 40 going through the hole 34.

The steel tube 46 enables the second inner plastic tube 44 to be firmly maintained such as to be straight. The plastic tubes 42 and 44 enable the steel support to be removed while reducing to a minimum any stress on the refractory during this operation.

A method for the production of long tubes of the invention from castable refractories using the moulds 96,98 will be described in the following. Raw materials having a grain size of 5 mm or less are used. Since the first and second tubes 64,66 according to a preferred embodiment of the present invention are made from the materials listed in Table 1, a method will be described using these materials. It is to be understood that the specific parameters (such as time periods and temperatures) of the present method can easily be adapted to a number of different appropriate materials using common skills of the art.

The dry materials of Table 1 are first introduced into a mixing machine and mixed for a period preferably not exceeding 4 minutes. Water is then added gradually in an amount within the range of 3.8 to 4.8 percent of the total contents and mixing continued for a preferred maximum time of 10 minutes. The refractory mix so obtained is poured into the appropriate mould, preferably within the next 45 minutes.

To cast the second tube 66, the refractory mix is poured into the second mould 98 from the top The mix is vibrated whilst pouring using an air, electric or mechanical vibrator, the vibrating means being either attached to the mould or inserted into the refractory mix. The vibration time depends on the tube length and should preferably not be longer than x minutes, where:

$$x = (\text{tube length in inches}) * (30 \text{ seconds}).$$

The second mould 98 is filled to the top and the refractory mix is then allowed to dry for at least 12 hours. The steel collars are then unscrewed, the tape along the vertical split in the outer plastic tube 30 is cut, the outer plastic tube 30 is removed and the inner steel tube 46 is withdrawn. The dry refractory piece with the remaining inner plastic tubes 42,44 inside is fired to a temperature no higher than 100° C. when the plastic tubes 42,44 become soft are easily extracted.

To cast the first tube 64, the refractory mix is poured into the first mould 96 from the top. Like for the second tube 66, the mix is vibrated whilst pouring with a vibration time is preferably less than x minutes. The first mould 96 is first filled to the junction line between the lower and upper parts 25,26 of the steel rod 20. With the refractory material in the mould 96 supporting the lower part 25 of the steel rod 20, the upper part 26 can be removed without affecting the stability and alignment of the lower part 25. Thus, the upper part 26 is removed, the plastic cap (not shown) placed over the newly uncovered top of the lower part 25, and the mould 96 filled to its top. The refractory piece is allowed to dry for at least 12 hours. The plastic tube 10 is then removed and the interior steel rod 20 unscrewed. The plastic film (not shown) which was on the rod 20 is simply pulled out.

After molding, both tubes 64,66 of refractory ceramic are fired to their appropriate firing temperature, with a preferred maximum value being 1200° C. The tubes 64,66 are preferably fired in a suspended position to allow for firing expansion without cracking.

As stated above, the presented method allows for the manufacture of a refractory thermocouple shield which can have a tube wall thickness of less than 1 cm and a tube length of more than 225 cm. This method provides a novel way of using castable refractory materials to minimize cracking and other defects and hence maximize strength and related properties, such as resistance to abrasion and mechanical impact. The present method enables the production of both hollow and solid cylindrical shapes having varying diameters along the length thereof with minimal risk of axial deformation during the forming process.

The embodiments of the invention described above are intended to be exemplary. Those skilled in the art will therefore appreciate that the foregoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A shield assembly for protecting a thermocouple, the assembly comprising:
    a first tube having an upper portion and a lower portion, the lower portion including a lower end, the first tube including a first elongated cavity closed at the lower end and receiving the thermocouple;
    a second tube having a second elongated cavity with at least one open end, the second elongated cavity receiving the upper portion of the first tube while a part of the lower portion of the first tube containing the thermocouple extends out of the open end; and
    an open gap between adjacent walls of the second elongated cavity and of the first tube, the gap being such as to allow independent thermal deformations of the first and second tubes;
    whereby the lower end and at least a portion of the part of the lower portion of the first tube are adapted to be in a first medium having a first temperature while the second tube is adapted to be in a second medium having a second temperature, the first and second temperatures being different.

2. The shield assembly according to claim 1, wherein the first temperature is lower than the second temperature.

3. The shield assembly according to claim 1, wherein the assembly is adapted to be used in a high temperature furnace, the first medium being a molten metal and the second medium being a furnace atmosphere.

4. The shield assembly according to claim 1, wherein at least part of the first and second tubes has a thickness that is at most 1 centimeter.

5. The shield assembly according to claim 1, wherein the second tube has a length of at least 1 meter.

6. The shield assembly according to claim 1, wherein the first and second tubes have circular cross-sections.

7. The shield assembly according to claim 6, wherein:
    the upper portion has a first outer diameter and the lower portion has a second outer diameter, the second outer diameter being smaller than the first outer diameter;
    the second elongated cavity has a first portion receiving the upper portion of the first tube and a second portion including the open end, the first portion having a first inner diameter and the second portion having a second inner diameter, the second inner diameter being smaller than the first inner diameter;
    the second outer diameter is smaller than the second inner diameter and the first outer diameter is smaller than the first inner diameter to define the gap; and
    the second inner diameter is smaller than the first outer diameter to retain the upper portion in the second elongated cavity.

8. The shield assembly according to claim 1, wherein the first and second tubes are made of a refractory castable ceramic.

9. The shield assembly according to claim 8, wherein the refractory castable ceramic is a silicon carbide with a SiC content of at least 50 percent per weight.

10. The shield assembly according to claim 8, wherein the refractory castable ceramic has a grain size that is at most 5 millimeters.

11. The method according to claim 1, wherein said open gap provides for allowing said first and second tubes to independently and freely expand.

* * * * *